(12) United States Patent
Honma

(10) Patent No.: US 7,933,199 B2
(45) Date of Patent: Apr. 26, 2011

(54) TRANSMISSION SYSTEM, PATH CONTROL METHOD AND TRANSMISSION DEVICE

(75) Inventor: Hiroyuki Honma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 108 days.

(21) Appl. No.: 12/340,904

(22) Filed: Dec. 22, 2008

(65) Prior Publication Data

US 2009/0290488 A1  Nov. 26, 2009

(30) Foreign Application Priority Data

May 23, 2008  (JP) .................. 2008-135372

(51) Int. Cl.
*H04J 1/00* (2006.01)

(52) U.S. Cl. ........................ 370/228; 370/252

(58) Field of Classification Search .......... 370/216–228, 370/252–253; 714/1–4, 48
See application file for complete search history.

(56) References Cited

U.S. PATENT DOCUMENTS

| | | | |
|---|---|---|---|
| 7,058,008 B1 * | 6/2006 | Wilson et al. ............. | 370/216 |
| 7,307,946 B2 | 12/2007 | Okuno | |
| 2002/0181479 A1 | 12/2002 | Okuno | |
| 2003/0235152 A1 | 12/2003 | Shibasaki | |
| 2004/0252633 A1 | 12/2004 | Acharya et al. | |
| 2006/0187715 A1 * | 8/2006 | Narvaez et al. ............ | 365/185.24 |
| 2008/0123519 A1 * | 5/2008 | Yang et al. ............... | 370/216 |

FOREIGN PATENT DOCUMENTS

| | | |
|---|---|---|
| EP | 1 973 250 A1 | 9/2008 |
| JP | 2002-359627 | 12/2002 |
| JP | 2004-32061 | 1/2004 |

OTHER PUBLICATIONS

United Kingdom Search Report dated May 8, 2009 and issued in corresponding United Kingdom Patent Application GB0901005.9.
ITU-T Recommendation G.707/Y.1322, "Network Node Interface for the Synchronous Digital Hierarchy (SDH)", URL:http://www.itu.int/rec/T-REC-G.707/en, Jan. 2007.
ITU-T Recommendation G.7042/Y1305, "Link Capacity Adjustment Scheme (LCAS) for Virtual Concatenated Signals", URL:http://www.itu.int/rec/T-REC-G.7042/en. Mar. 2006.

* cited by examiner

*Primary Examiner* — Ricky Ngo
*Assistant Examiner* — Pao Sinkantarakorn
(74) *Attorney, Agent, or Firm* — Fujitsu Patent Center

(57) ABSTRACT

The present invention is a transmission system, a path control method, and a transmission device, and is the path control method in the transmission system forming a virtual concatenation group by virtually concatenating each path signal transmitted through a plurality of paths being a logical communication path, which manages an active state and a stand-by state of member paths of the virtual concatenation group and when there is abnormality in any of the member paths in the active state, controls any of the member paths in the stand-by state to the active state in place of the abnormal member path, thereby realizing more flexible and efficient path level redundancy.

20 Claims, 14 Drawing Sheets

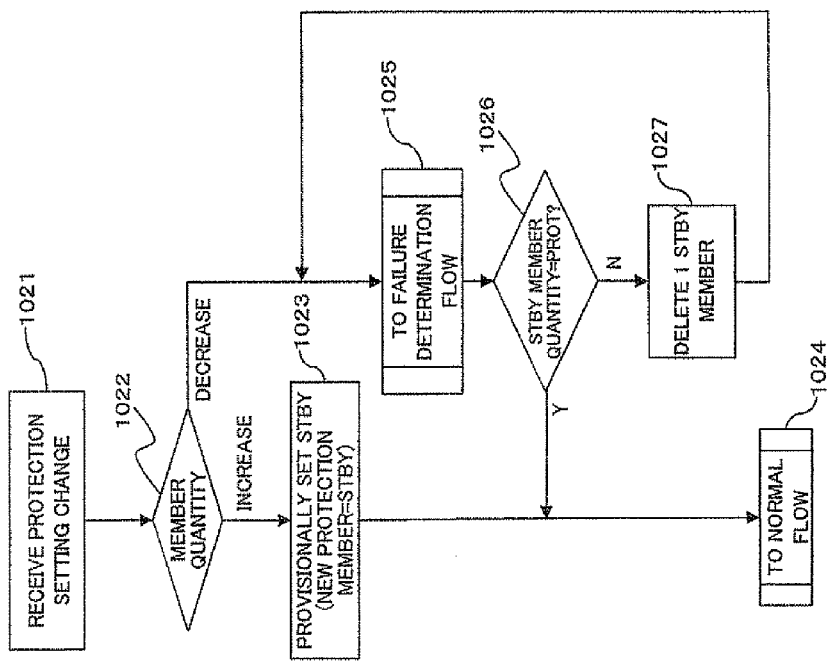

TRANSMISSION SYSTEM, PATH CONTROL METHOD AND TRANSMISSION DEVICE

CROSS-REFERENCE TO RELATED APPLICATION(S)

This application is based upon and claims the benefit of priority of the prior Japanese Application No. 2008-135372, filed on May 23, 2008 in Japan, the entire contents of which are hereby incorporated by reference.

FIELD

The present invention relates to a transmission system, a path control method, and a transmission device. The present invention may be used in the transmission device of a synchronous optical network (SONET) and a synchronous digital hierarchy (SDH) (hereinafter, represented as SONET/SDH) and a peripheral technology thereof.

BACKGROUND

As a network, which conforms to the SONET/SDH, a virtual concatenation (VCAT) technology is known as one of technologies to efficiently accommodate a data signal such as a Ethernet (registered trademark) signal.

According to the VCAT technology, a VCAT signal in a transmission band obtained by arbitrary multiplying the transmission band of the SONET/SDH path may be generated, by virtually concatenating arbitrary number of SONET/SDH paths. This allows to transparently transmit the signals of various data rates to the network of the SONET/SDH.

In addition, a link capacity adjustment scheme (LCAS) also is known as one of the technologies capable of hitlessly (without failure) and dynamically adjusting a size (transmission band) of a virtual concatenation group (VCG).

Meanwhile, the VCAT is defined by the International Telecommunication Union Telecommunication Standardization Sector (ITU-T) recommendation G. 707, and the LCAS is defined by the ITU-T recommendation G. 7042.

[Patent Document 1] Japanese Laid-Open Patent Application No. 2004-32061

[Non-Patent Document 1] ITU-T recommendation G.707, "Network node interface for the synchronous digital hierarchy (SDH)", [online], January 2007, ITU-T, [searched on Apr. 7, 2008], Internet <URL: http://www.itu.int/rec/T-REC-G.707/en>

[Non-Patent Document 2] ITU-T recommendation G.7042, "Link capacity adjustment scheme (LCAS) for virtual concatenated signals", [online], March 2006, ITU-T [searched on Apr. 7, 2008], Internet <URL: http://www.itu.int/rec/T-REC-G.7042/en>

When a failure occurs in the VCG member path, the conventional technology may only eliminate the VCG member path in which the failure occurs from the operational member by using the LCAS protocol and operate with remaining VCG member paths.

Also, when realizing path level redundancy, this may only switch between the VCG member paths fixedly set as current and backup in advance.

(1) A transmission system that virtually concatenates each path signal transmitted through a plurality of paths being a logical communication path to form a virtual concatenation group, the system including:

managing means for managing an active state and a stand-by state of member paths of the virtual concatenation group; and control means for controlling any of the member paths in the stand-by state to the active state in place of any of the member paths in the active state that has abnormality, can be used.

(2) A path control method in a transmission system that virtually concatenates each path signal transmitted through a plurality of paths being a logical communication path to form a virtual concatenation group, the method including:

managing an active state and a stand-by state of member paths of the virtual concatenation group; and controlling any of the member paths in the stand-by state to the active state in place of any of the member paths in the active state that has abnormality, can be used.

(3) A transmission device on a receiving side for receiving a path signal from the transmission device on a transmitting side that virtually concatenates each path signal transmitted through a plurality of paths being a logical communication path to form a virtual concatenation group, the device including:

managing means for managing an active state and a stand-by state of member paths of the virtual concatenation group; and control means for controlling any of the member paths in the stand-by state to the active state in place of any of the member paths in the active state that has abnormality, can be used.

Additional objects and advantages of the invention(s) will be set forth in part in the description which follows, and in part will be obvious from the description, or may be learned by practice of the invention(s). The object and advantages of the invention will be realized and attained by means of the elements and combinations particularly pointed out in the appended claims.

It is to be understood that both the foregoing general description and the following detailed description are exemplary and explanatory and are not restrictive of the embodiment, as claimed.

BRIEF DESCRIPTION OF THE DRAWINGS

FIG. 14 is a flowchart for illustrating the operation (protection member path setting change flow) of the node illustrated in FIGS. 8 and 9.

DESCRIPTION OF EMBODIMENT(S)

Hereinafter, an embodiment is described with reference to the drawings. The embodiment to be described below is illustrative only, and it is not intended to exclude various modifications and application of the technique not clearly illustrated below. That is to say, this embodiment may be implemented with various modifications (such as combination of examples) without departing from the spirit thereof.

[1] First Embodiment

Figure 1:
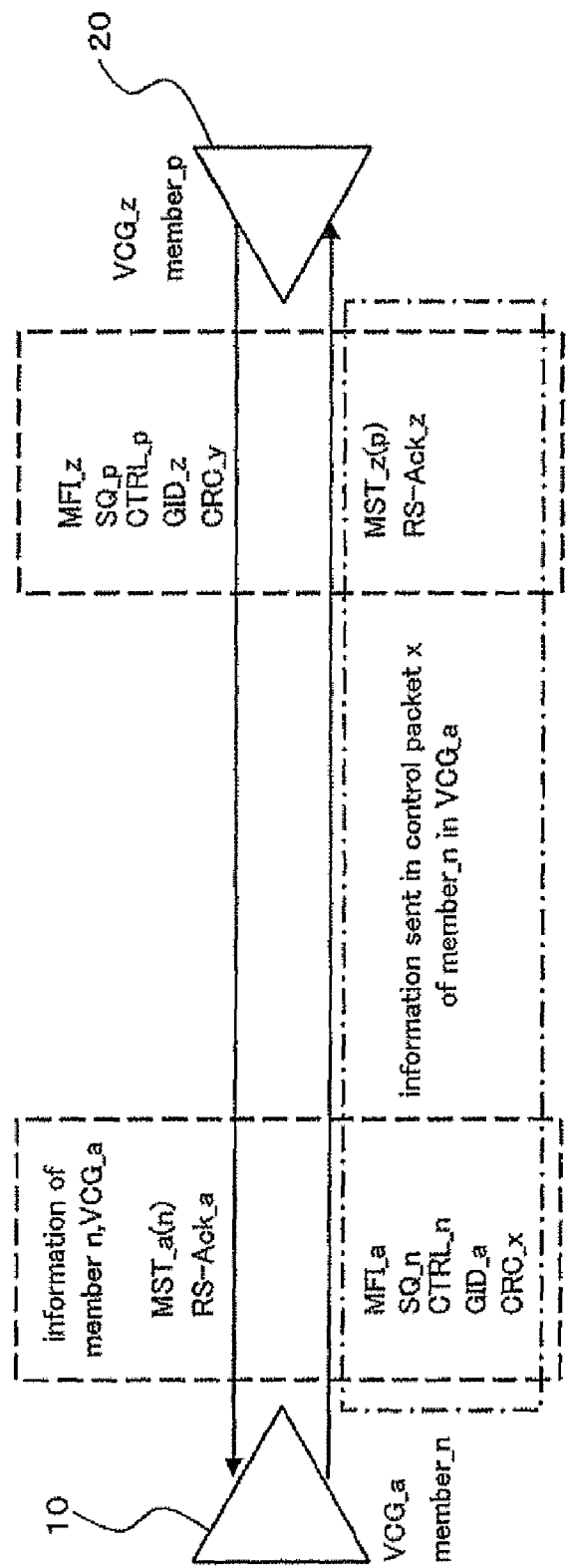
FIG. 1 is a view illustrating an example of control information of an LCAS protocol transmitted and received between nodes according to an embodiment.

FIG. 1 illustrates an example of control information in an LCAS protocol transmitted and received between nodes 10 and 20 as an example of a transmission device. Meanwhile, the nodes 10 and 20 compose the transmission device, for example, in a SDH/SONET. Bidirectional communication is possible between the nodes 10 and 20 through a communication path such as an optical transmission path. A transmitting node 10 (or 20) is referred to as a "source", and a receiving node 20 (or 10) is referred to as a "sink".

The control information in the LCAS may be set in an overhead of a path signal (path overhead) (H4 byte, for example) in the SDH/SONET. The path signal in the SDH corresponds to, for example, a virtual container (VC) signal, and the path signal in the SONET corresponds to a synchronous transport signal (STS) signal. Such path signals are mapped to a synchronous payload envelope (SPE) of a SDH/SONET transmission frame. A VCAT virtually concatenates a plurality of such path signals to map to the SPE.

The control information transmitted in a direction from the transmitting node (source) to the receiving node (sink) (forward direction) includes a multi-frame indicator (MFI), a sequence indicator (SQ), a control (CTRL), a group indicator (GID), and a cyclic redundancy check code (CRC), as illustrated in FIG. 1.

The MFI, on a transmitting side, is number information common to VCG member paths, and incremented for each transmission frame, for example. The MFI, on a receiving side, absorbs a time difference for each VCG member path (decides a differential delay) and is used to restore synchronous payload envelope data of the VCG member paths.

The SQ is a sequence number, and the same sequence number is allocated to the member paths belonging to the same VCG. However, the SQ of the member path transmitting CTRL=Idle is not effective. The SQ larger than the SQ of the member path transmitting CTRL=end of sequence (EOS) is set for the member path deleted from the VCG.

The CTRL is used for transmitting the information (notifying a state) from the transmitting side to the receiving side, and for synchronizing the transmitting side and the receiving side. The CTRL includes an ADD command, a NORM command, an EOS command, an IDLE command, a do not use (DNU) command, and the like.

The ADD command is the command to indicate that the member path is to be added to the VCG, and the NORM command is the command to indicate to be in a normal transmitting state (normal). The EOS command is the command to indicate an end of sequence and to be in the normal transmitting state, and the IDLE command is the command to indicate that the member path is not included in the VCG or this is to be deleted. The DNU command is the command to indicate that the synchronous payload envelope is not used yet and to be in line failure (FAIL).

The GID is the information used for identifying the VCG, and a pseudo random number is used, for example. The same GID is allocated to each member path of the same VCG.

The CRC is used to confirm change in a virtual concatenation overhead.

On the other hand, the control information of a control packet transmitted in a direction from the receiving side to the transmitting side (return direction) includes a member status (MST) and re-sequence acknowledge (RS-Ack), for example.

The MST is the information to indicate a state of the VCG member path. The MST includes two states, which are OK and FAIL. The receiving side transmits the MST together with the SQ received from the transmitting side to the transmitting side. When received CTRL=IDLE or DNU, this transmits MST=FAIL. When received CTRL=ADD or NORM or EOS, this transmits MST=OK.

The RS-Ack notifies the transmitting side of detection of state change by setting an RS-Ack bit to repetition of (0→1→0) when detecting the state change on the receiving side. When the transmitting side receives the RS-Ack, this starts transmitting the MST to be transmitted next.

By using the LCAS protocol as described above, in this example, when path abnormality occurs in any of the VCG member paths in an operational state, another VCG member path in a nonoperational state may be set to the operational (active) state to be supplied in place of the member path in which the path abnormality occurs. Thereby, it becomes possible to prevent an operational band from largely varying (increasing and decreasing) before and after path failure occurs.

Meanwhile, the "path abnormality" includes a case in which the failure occurs in the SONET/SDH path itself, a case in which a reception error occurs due to a quality deterioration of the path signal or the like, and abnormality in the LCAS protocol communication. Hereinafter, the case in which the failure occurs in the SONET/SDH path itself is especially referred to as the "path failure" and this may be sometimes distinguished from other path abnormality.

The member path in the nonoperational state used in the supply may be any of protection member paths set as backup (protection) member paths in advance, or may be any of work member paths set as current (work) member paths in advance.

For example, for each of the work member paths and the protection member paths, the active (ACT) state, which means to be in the operational state or an available state, and a stand-by (STBY) state, which means to be in the nonoperational state (stand-by state) other than the active state are defined and managed. Then, the paths in the STBY state may be made target of the supply regardless of an original work/protection setting (whether to be the work member path or the protection member path).

Thereby, since the VCG member path is not fixed to the work/protection setting, redundancy with a free (flexible) combination may be realized, and the redundancy with an optimal efficiency according to a network configuration becomes possible. Meanwhile, with regard to the STBY state also, it is possible to define (determine) a normal STBY state and an abnormal STBY state, and use the member path in the normal STBY state in the supply by eliminating the member path in the abnormal STBY state.

The setting (initial setting) of a member path quantity in the ACT/STBY state may be performed by a high-level device such as a network management system (NMS), which is not illustrated in the drawing, or may be autonomously performed by the nodes 10 and 20 at initial activating or the like. A criterion of this setting may be a setting value of the work/protection member quantity. At that time, it is also possible to set which of the work/protection member paths is preferentially made a control target to the ACT state. In addition, this setting may be appropriately changed by the high-level device, for example.

Figure 2:
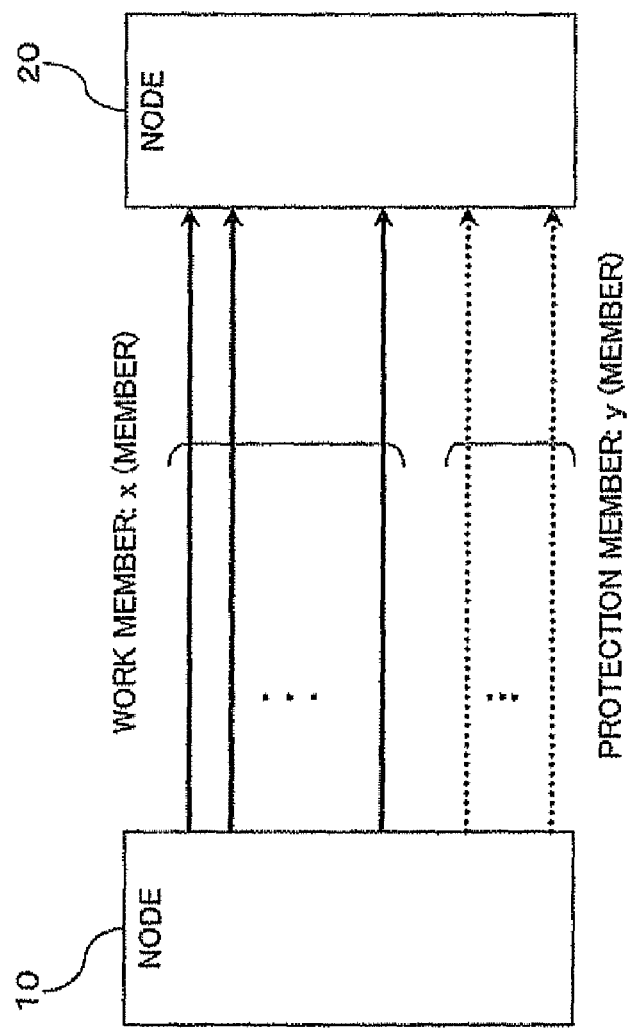
FIG. 2 is a view schematically illustrating a VCG member configuration example at normal times.
Figure 3:
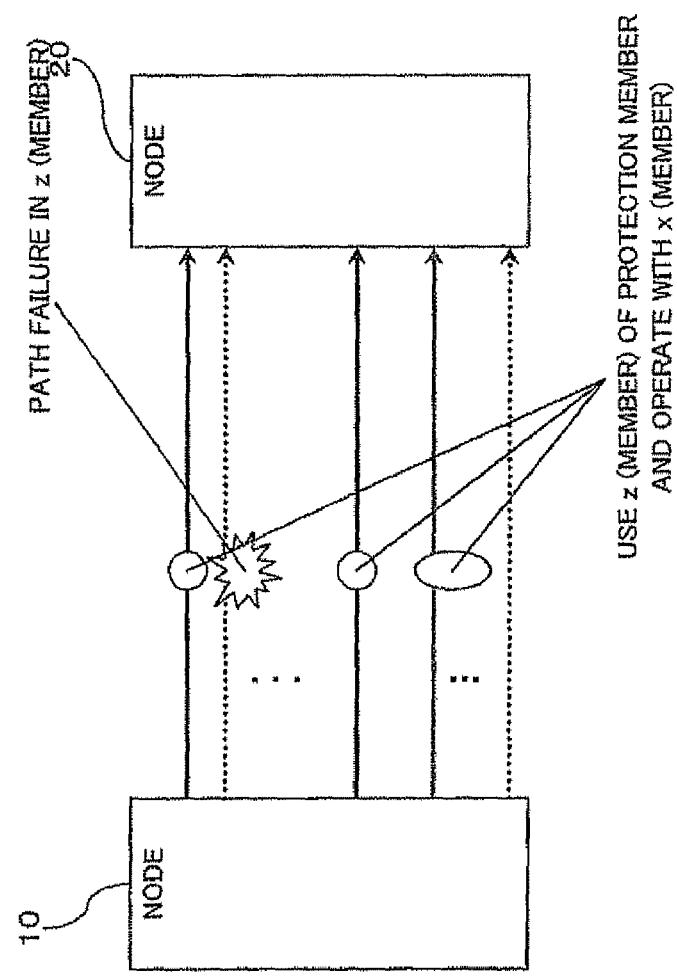
FIG. 3 is a view schematically illustrating the VCG member configuration example when a path failure occurs.

An example is illustrated in FIGS. 2 and 3. Meanwhile, in a following description, it is supposed that the node 10 is the transmitting side (source) and the node 20 is the receiving side (sink). However, a case in which the node 20 is the transmitting side (source) and the node 10 is the receiving side (sink) is similar to the following description.

As illustrated in FIG. 2, the paths for x members (x is a natural number) as the work member paths at the time of the normal operation and the paths for y members (y is a natural number and it is possible that y=x) as the protection member paths at the time of the normal operation (SONET/SDH paths) are configured (provisionally set) between the nodes 10 and 20.

Then, as illustrated in FIG. 3, it is supposed that the path abnormality occurs in any one or a plurality (for example, it is supposed to be a z member) of the member paths in the operational state for x members as the work member paths. In this case, any member path for the z member of the member paths in the STBY state (for example, the protection member paths) is supplied to the member path in the operational state as the member path in the ACT state. Thereby, it is possible to continue the operation with the same quantity of the member paths in the operational state as before the path abnormality occurrence and it is possible to prevent the operational band from varying (increasing and decreasing) before and after the path abnormality occurrence. In addition, VCG member path redundancy may be realized with a free combination of x:y ($1 \leq y \leq x$).

Figure 4:
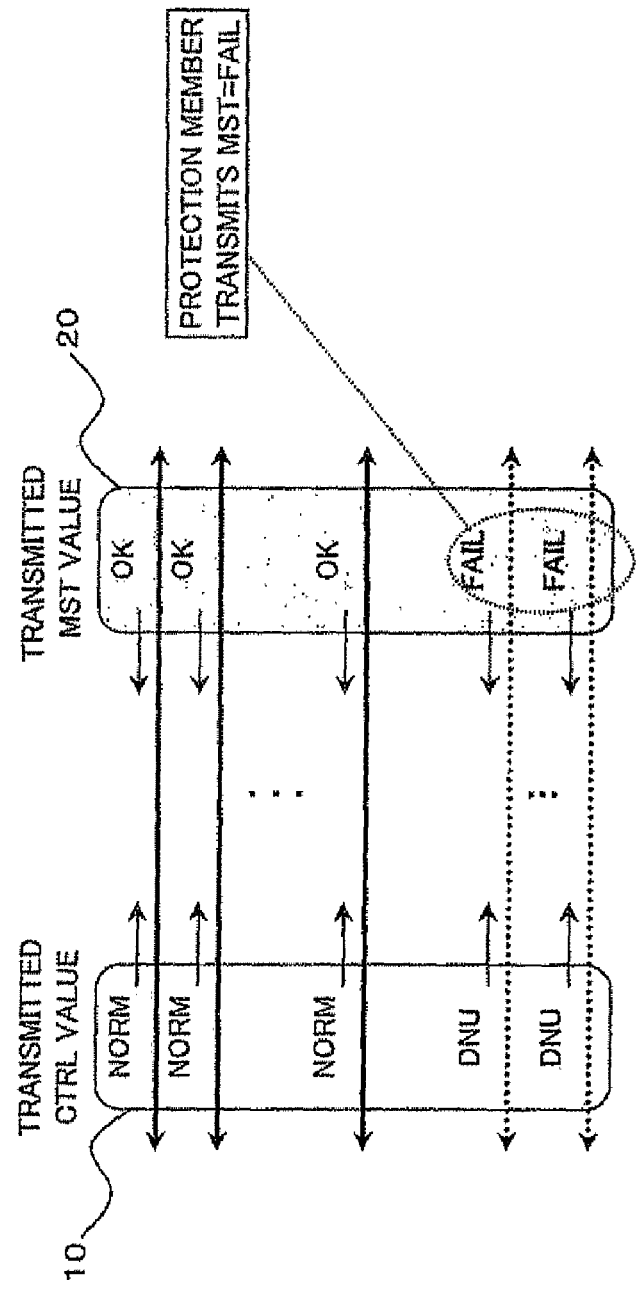
FIG. 4 is a view schematically illustrating a transmission and reception example of the control information of the LCAS protocol at normal times.
Figure 5:
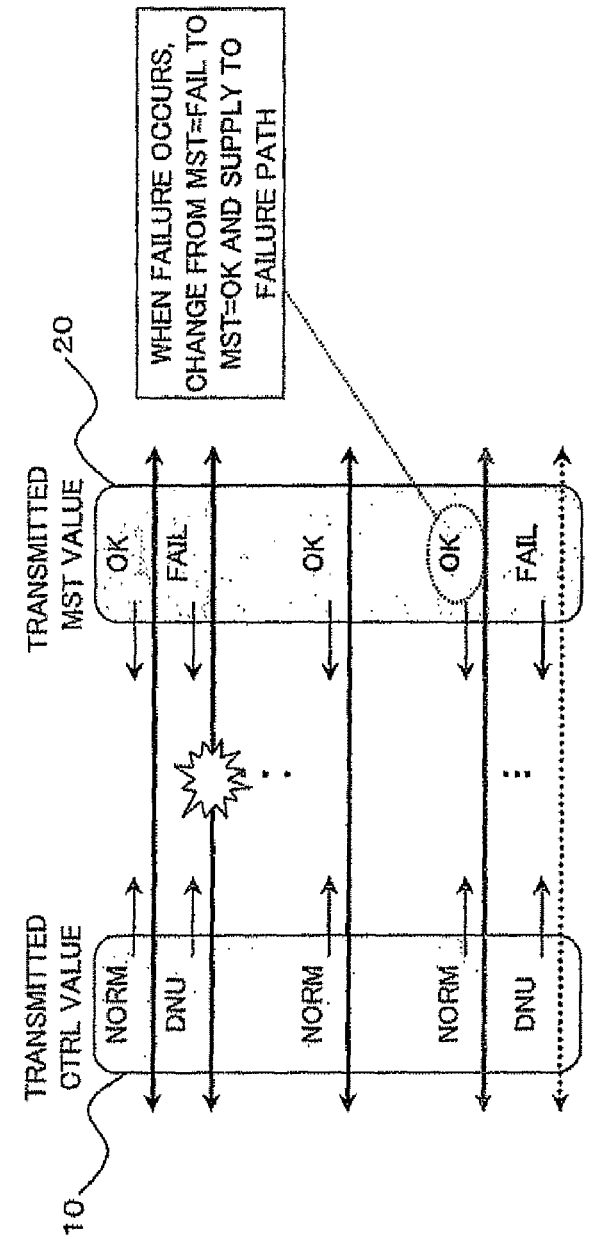
FIG. 5 is a view schematically illustrating the transmission and reception example of the control information of the LCAS protocol when the path failure occurs.

An example of the control information (CTRL, MST) of the LCAS protocol transmitted and received between the nodes 10 and 20 when performing the control of the ACT/STBY state of the member path as above is illustrated in FIGS. 4 and 5.

First, as an example of the initial setting, when setting the work member paths for the x members between the nodes 10 and 20, the transmitting side node 10 sets the control information (CTRL=ADD) to indicate addition of the path to be set as the work member path to a corresponding path signal based on the LCAS protocol, and transmits the path signal to the node 20.

Also, as an example of the initial setting, when setting the protection member paths for the y members, the transmitting side node 10 sets the control information (CTRL=DNU) indicating that the path to be set as the protection member path is not used to the corresponding path signal, and transmits the path signal to the receiving side node 20.

Then, at the time of normal operation, when the path failure dose not occur in the SONET/SDH path, the transmitting side node 10 transmits (sets) CTRL=NORM or EOS for the path in the operational state (member path in the ACT state) out of the work member paths for the x members. Also, this transmits (sets) CTRL=DNU for the member path in the STBY state.

Therefore, when the path failure does not occur in the SONET/SDH path, for the member path in the ACT state (ACT member path), a normality determination condition of the ACT member path is that CTRL=ADD or NORM or EOS is received.

On the other hand, for the member path in the STBY state (STBY member path), when the path failure does not occur in the SONET/SDH path, the normality determination condition of the STBY member path is that CTRL=ADD or DNU is received.

Then, the receiving side node 20 may confirm the normality of each of the ACT member path and the STBY member path according to the normality determination conditions, by monitoring presence or absence of the reception of the information indicating the path failure of the SONET path and received control information (CTRL) in the LCAS protocol.

Then, when the path failure occurs in the SONET/SDH path, a state of the corresponding member path becomes the abnormal STBY state, and the receiving side node 20 transmits MST=FAIL to the transmitting side node 10 with regard to the abnormal member path.

Also, in a state in which the path failure does not occur in the SONET/SDH path, when the normality of the ACT member path is confirmed, it becomes the ACT state. In this case, the receiving side node 20 transmits MST=OK to the transmitting side node 10 with regard to the ACT member path.

When the path failure does not occur in the SONET/SDH path, when the normality of the ACT member path cannot be confirmed, or the normality cannot be confirmed for a continuous predetermined time period, it becomes the abnormal STBY state. In this case, the receiving side node 20 transmits MST=FAIL to the transmitting side node 10 with regard to the abnormal member path.

When the normality of the STBY member path is confirmed, it becomes the normal STBY state, and the receiving side node 20 transmits MST=FAIL to the transmitting side node 10 with regard to the STBY member path. When the normality of the STBY member path cannot be confirmed, or the normality cannot be confirmed for a continuous predetermined time period, it becomes the abnormal STBY state. In this case, the receiving side node 20 transmits MST=FAIL to the transmitting side node 10 with regard to the abnormal STBY member path.

That is to say, the receiving side node 20 transmits MST=FAIL to the transmitting side node 10 as an example of state notifying information in the LCAS protocol with regard to the member path in the STBY state regardless of normality or abnormality of the member path. Therefore, the transmitting side node 10 may perform communication based on the existing LCAS protocol without being conscious of distinction whether the member path in the STBY state is normal or abnormal. In other words, it is not necessary to alter the existing LCAS protocol, so that the communication control never becomes complex.

Figure 6:
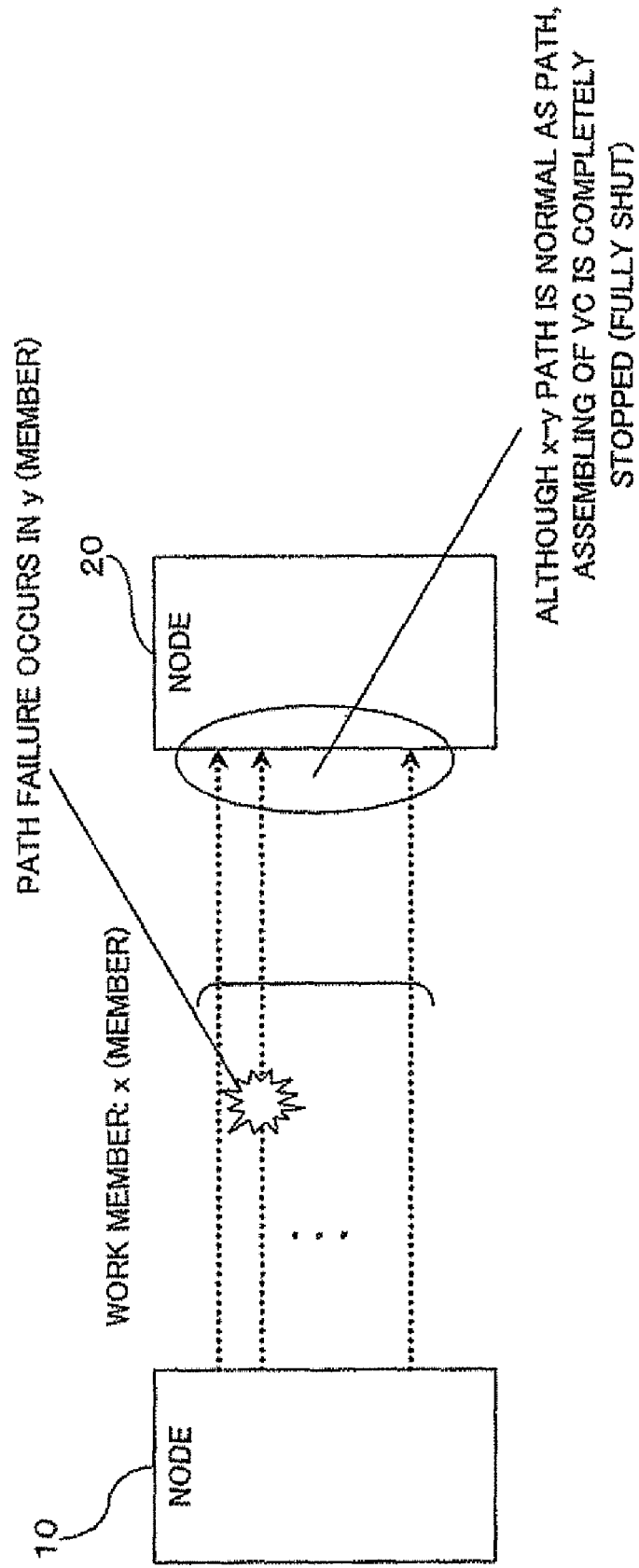
FIG. 6 is a schematic diagram illustrating a current VCG operation example when the path failure occurs.

Then, supposing that the path abnormality occurs in the ACT member path for any one or a plurality (y members) of the work member paths as illustrated in FIG. 5, at the time of such normal operation. In this case, as illustrated in FIG. 6, although the continuous operation is possible for the path other than the ACT member path in which the abnormality occurs (paths for x-y members), generation (composition) of the VCAT is imperfect, so that the communication as an entire work member becomes impossible (disconnected state).

In this case, as illustrated in FIG. 5, the receiving side node 20 sets the ACT member path in which the path abnormality occurs to the abnormal STBY state, and transmits CTRL=FAIL to the transmitting side node 10 with regard to the abnormal member path.

When the transmitting side node 10 receives the MST=FAIL from the receiving side node 20 with regard to the ACT member path for which CTRL=NORM or EOS has been transmitted, this eliminates the member path from the generation of the VCAT and transmits CTRL=DNU to the receiving side node 20 with regard to the member path. Thereby, the path of the abnormal member is eliminated from the generation of the VCAT.

Figure 7:
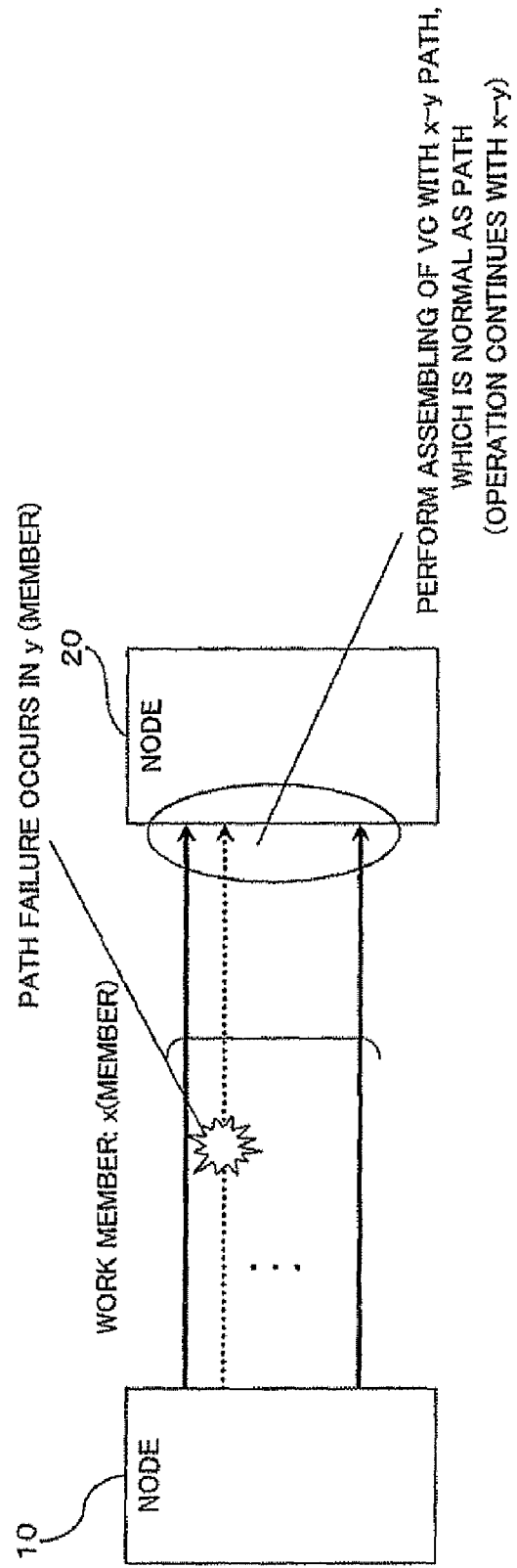
FIG. 7 is a schematic diagram illustrating the current VCG operation example when the path failure occurs.

Although the transmitting side node 10 may continue the normal operation by performing the generation of the VCAT with regard to remaining normal x-y member paths as illustrated in FIG. 7, in this case, the operational band is decreased by the band for the eliminated y members.

In this example, such decrease in the operational band is supplied by the (normal) STBY member path.

That is to say, as illustrated in FIG. 5, when the receiving side node 20 detects the path abnormality, this transmits MST=OK to the transmitting side node 10 with regard to any of the normal STBY member paths. That is to say, the receiving side node 20 changes (rewrites) MST=FAIL set to the transmitting side node 10 for received CTRL=ADD or DNU from the transmitting side node 10 to MST=OK.

The transmitting side node 10 incorporates the member path, which receives the MST=OK from the receiving side node 20, to generation of the VCAT as the ACT member path. Also, the transmitting side node 10 transmits CTRL=NORM or EOS to the receiving side node 20 with regard to the ACT member path. Thereby, the STBY member path is supplied as the ACT member path in place of the path in which the path abnormality occurs, thereby enabling the operation in the same operational band as that before the path abnormality occurs.

[2] Example

Hereinafter, a configuration example of the nodes 10 and 20 enabling the above-described operation is described in detail with reference to FIGS. 8 and 9.

Figure 8:
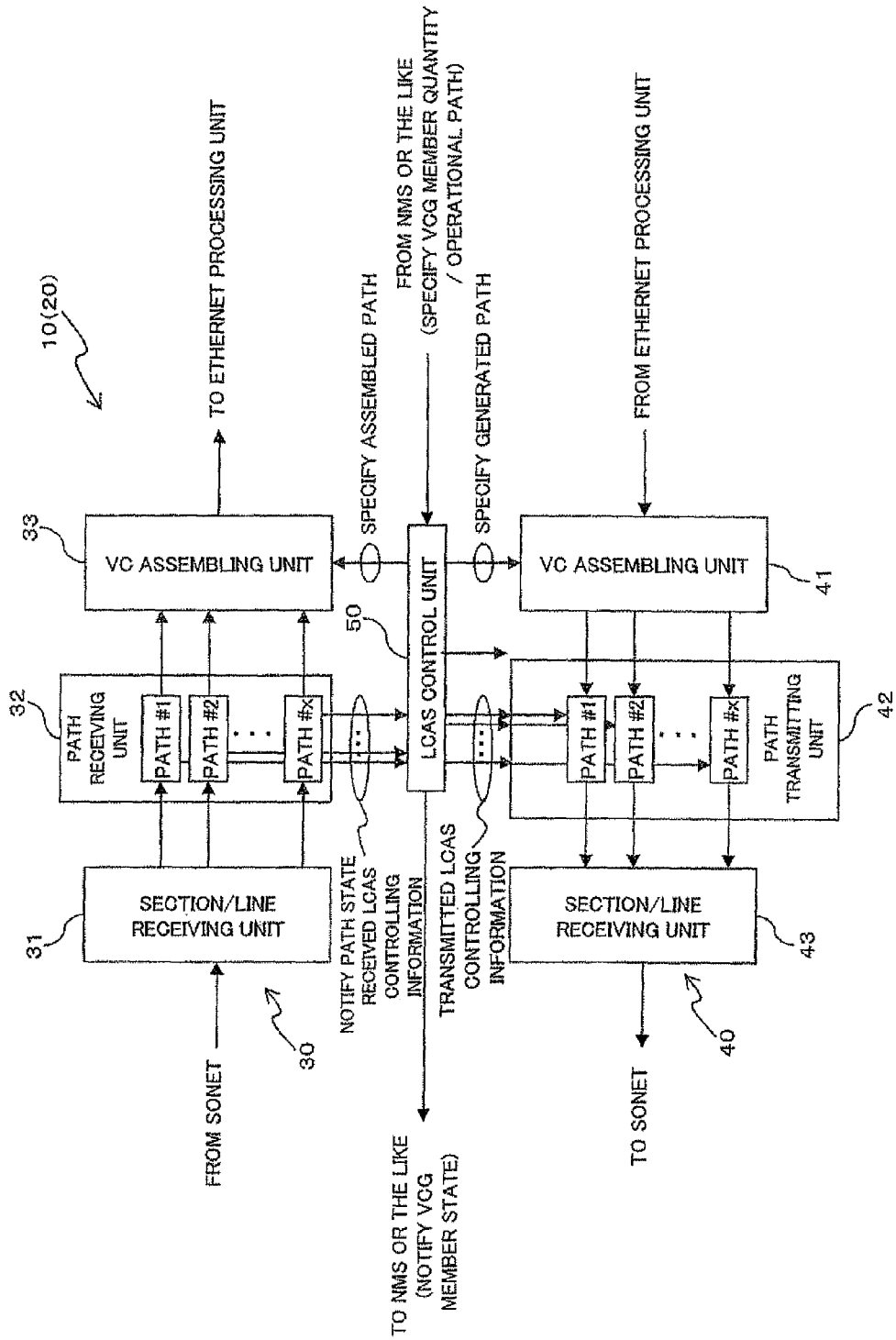
FIG. 8 is a block diagram illustrating a configuration example of a node according to this embodiment.

FIG. 8 is a block diagram illustrating the configuration example of the nodes 10 and 20. FIG. 8 illustratively illustrates the configuration of the node 10 (20) capable of transparently transmitting data of the Gigabit Ethernet (registered mark) to the transmission path of the SONET (or SDH, same as above).

As illustrated in FIG. 8, the node 10 (20) is provided with a section/line receiving unit 31, a path receiving unit 32, and a VC assembling unit 33, as an example of a receiving system 30 for receiving the signal (transmission frame) from the SONET. Also, the node 10 (20) is provided with a VC generating unit 41, a path transmitting unit 42, and a section/line transmitting unit 43, as an example of a transmitting system 40 for transmitting the signal to the SONET. Further, the node 10 (20) is provided with an LCAS control unit 50 as an example of a control system for controlling processing (including LCAS protocol processing) in the transmitting system 30 and the receiving system 40.

In the transmitting system 30, the section/line receiving unit 31 is provided with a function of receiving the transmission frame having a predetermined format from the SONET to terminate the overhead (section overhead and line overhead) in the transmission frame and a function to perform pointer processing. Meanwhile, the transmission frame is, for example, optical carrier (OC)-n (n=3, 48, 192, or the like) in an optical level, and synchronous transport signal (STS)-n in an electric level, or the like.

As described above, one or a plurality of path signal may be multiplexed into the synchronous payload envelope (SPE) of the transmission frame. For example, in a case of a STS-3 frame, three STS-1 path signals may be multiplexed, and in a case of a STS-48 frame, 48 STS-1 path signals or 16 STS-3 path signals may be multiplexed into the SPE. A multiplexing position of each path signal in the SPE is indicated by an AU pointer. When the signals of a plurality of paths are multiplexed in this manner, each multiplexing position is specified by the pointer processing of the AU pointer and is transferred to the path receiving unit 32. Meanwhile, FIG. 8 illustrates a state in which the path signals of x paths #1 to #x are obtained.

Meanwhile, the "path" corresponds to a logical communication path of a predetermined band (such as 50 Mbps, 150 Mbps, 600 Mbps and 2.4 Gbps), the "line" corresponds to a multiplex transmission section in which one or a plurality of "path" is bundled, and the "section" corresponds to a relay section, which separates the "line". The section overhead (SOH) may include information for managing the "section", and the line overhead (LOH) may include information for managing the "line". The path overhead (POH) is provided for each path signal and this may include the information for managing the "path". The control information of the LCAS protocol may be included in the POH.

The path receiving unit 32 is provided with a function to receive the path signals (#1 to #x) from the section/line receiving unit 31, and to detect the information (such as alarm information) indicating the state of the SONET/SDH path and the control information (including the MST) of the LCAS for each path. The information is included in the POH of the path signal (VC signal), for example, and is notified to the LCAS control unit 50.

The VC assembling unit 33 generates (assembles) each VC signal based on the signal of the VCG member path out of the path signals processed in the path receiving unit 32. Specification (for example, specification of the above-described MFI and SQ) of the path signal used for assembling is performed by the LCA control unit 50. Meanwhile, predetermined processing such as decapsulation based on a generic framing procedure (GFP) is applied to the generated VC signal in an Ethernet processing unit not illustrated.

On the other hand, in the transmitting system 40, the VC generating unit 41 generates the VC signal (path signal) based on the signal to which capsulation or the like based on the GFP is applied in the Ethernet processing unit not illustrated. A plurality of (x, for example) VC signals may be generated. The path signal to be generated is specified by the LCAS control unit 50.

The path transmitting unit 42 sets a necessary POH to the path signal generated in the VC generating unit 41. The control information (such as CTRL, MST) given by the LCAS control unit 50 may be included in the POH. Also, the path transmitting unit 42 virtually groups any of path signals to concatenate. For example, by grouping four STS-1 paths (50 Mbps) as one VCG to concatenate, one path of 200 Mbps may be realized. The LCAS control unit 50 specifies the path signal and the VCG member to be associated with each other.

The section/line transmitting unit 43 generates the transmission frame of the SONET based on each path signal from the path transmitting unit 42 and transmits the same to the SONET transmission path. That is to say, each path signal is mapped to the SPE of the transmission frame and the necessary overhead (section overhead and line overhead) is added to the same, and is transmitted to the SONET transmission path. Meanwhile, the VC signal, which is not virtually concatenated, may be included in the SPE.

The LCAS control unit 50 controls the processing regarding the VCG member path as described above based on the LCAS protocol.

Figure 9:
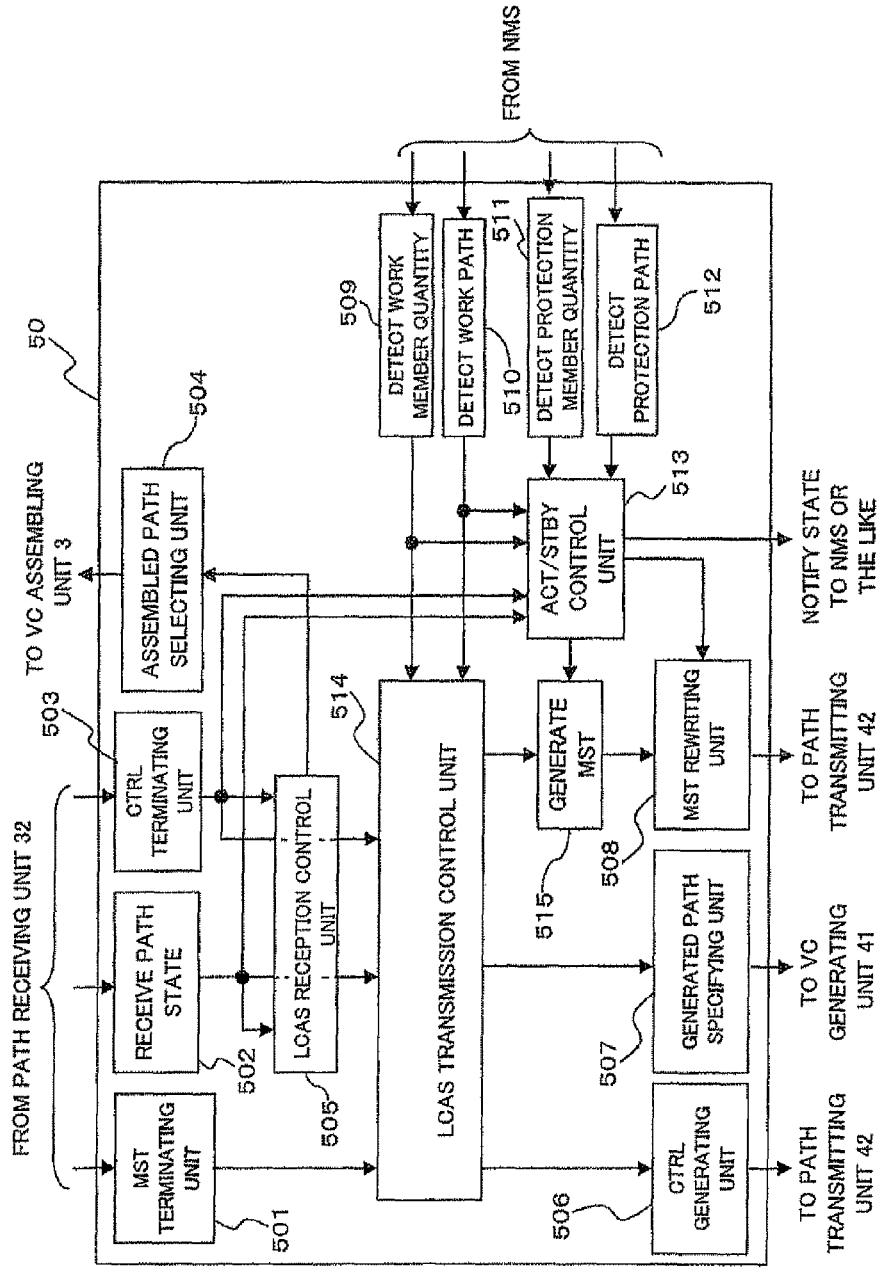
FIG. 9 is a block diagram illustrating a configuration example of an LCAS control unit illustrated in FIG. 8.

The configuration example of the LCAS control unit 50 is illustrated in FIG. 9. The LCAS control unit 50 illustrated in FIG. 9 is illustratively provided with an MST terminating unit 501, a path state receiving unit 502, a CTRL terminating unit 503, an assembled path selecting unit 504, and an LCAS reception control unit 505. Also, the LCAS control unit 50 is further provided with a CTR generating unit 506, a generated path specifying unit 507, and an MST rewriting unit 508. Further the LCAS control unit 50 is provided with a work member quantity detecting unit 509, a work path detecting unit 510, a protection member quantity detecting unit 511, a protection path detecting unit 512, an ACT/STBY control unit 513, an LCAS transmission control unit 514, and an MST generating unit 515.

The MST terminating unit 501 terminates received LCAS controlling information from the path receiving unit 32 to obtain the VCG member status information (MST). The obtained MST is passed to the LCAS transmission control unit 514.

The path state receiving unit 502 receives the information (such as alarm information) indicating the state of the path received from the path receiving unit 32, and transfers the same to the LCAS reception control unit 505, the ACT/STBY control unit 513, and the LCAS transmission control unit 514.

The CTRL terminating unit 503 terminates the received LCAS controlling information from the path receiving unit 32 to obtain the control information (CTRL) regarding the VCG member. The obtained CTRL is passed to the LCAS reception control unit 505, the ACT/STBY control unit 513, and the LCAS transmission control unit 514.

The LCAS reception control unit 505 generates information to specify the path to be assembled in the VC assembling unit 33 based on the information from the path state receiving unit 502 and the information (CTRL) from the CTRL terminating unit 503, and gives the same to the assembled path selecting unit 504. The path of which information from the path state receiving unit 502 indicates the abnormality is eliminated from the assemble target.

The assembled path selecting unit 504 selects the path, which is the assemble target in the VC assembling unit 33, based on the specification information from the LCAS reception control unit 505 to notify the VC assembling unit 33 of the same.

The CTRL generating unit 506 generates CTRL which should be set for the path signal processed in the path transmitting unit 42 according to the instructions by the LCAS transmission control unit 514 and notifies the path transmitting unit 42 of the CTRL. For example, CTRL=NORM or EOS is generated with regard to the path in which MST=OK is obtained in the MST terminating unit 501.

The generated path specifying unit 507 generates the information for specifying the path signal, which should be generated in the VC generating unit 41, according to the instructions by the LCAS transmission control unit 514, and gives the information to the VC generating unit 41.

The work member quantity detecting unit 509 detects the setting information regarding the work member quantity received from the high-level device such as the NMS, and gives the detected setting information to the LCAS transmission control unit 514.

The work path detecting unit 510 detects the setting information (the VCG member path to be provisionally set as the work member path) regarding the work path received from the high-level device such as the NMS, and gives the detected setting information to the LCAS transmission control unit 514.

The protection member quantity detecting unit 511 detects the setting information regarding the protection member quantity received from the high-level device such as the NMS, and gives the detected setting information to the ACT/STBY control unit 513.

The protection path detecting unit 512 similarly detects the setting information (the VCG member path to be provisionally set as the protection member path) regarding the protection path received from the high-level device such as the NMS, and gives the detected setting information to the ACT/STBY control unit 513.

The ACT/STBY control unit 513 manages (determines/controls) the ACT/STBY state of the VCG member path, based on the setting information obtained by each of the detecting units 509 to 512, the information regarding the path state obtained in the path state receiving unit 502, and the received LCAS controlling information (CTRL) obtained in the CTRL terminating unit 503. Thereby, it is possible to control (add/delete/switch) the operational member path. For example, the member path determined to have the path abnormality is set to the abnormal STBY state, and the path in the normal STBY state is set to the ACT state, thereby changing (supplying) the operational member path.

The MST generating unit 515 generates the transmitted LCAS information (MST=OK or FAIL) according to the instructions by the LCAS transmission control unit 514. For example, this generates MST=OK regarding the member path of which received LCAS controlling information (CTRL) obtained in the CTRL terminating unit 503 is ADD or NORM or EOS, and generates MST=FAIL with regard to the member path of which received CTRL is IDLE or DNU.

The MST rewriting unit 508 rewrites MST generated in the LCAS transmission control unit 514, according to the state determination result in the ACT/STBY control unit 513. By rewriting MST, it is not necessary to alter the existing LCAS protocol, so that the communication control never becomes complex.

For example, when the VCG member path in the STBY state is set to the ACT state, MST=FAIL is rewritten to MST=OK regarding the member path. Meanwhile, since there is a case in which the rewrite is not necessary, this may be selectively performed. MST is set in the path transmitting unit 42. Thereby, the path transmitting unit 42 sets the MST to, for example, POH of the path signal of the VCG member path.

That is to say, the ACT/STBY control unit 513 and the MST rewriting unit 508 in this example are used as an example of managing means for managing the ACT state and the STBY state of the VCG member path. Also, the units 513 and 508 are used as an example of control means for controlling any of the member paths in the STBY state to the ACT state in place of the member path when there is the abnormality in any of the member paths in the ACT state.

Meanwhile, the ACT/STBY control unit 513 and the MST rewriting unit 508 may be incorporated as a function of the LCAS transmission control unit 514. Also, each of the detecting units 509 to 512 may be incorporated as a function of the LCAS transmission control unit 514.

The LCAS transmission control unit 514 is used as an example of a communication control unit for performing the communication control by the LCAS protocol together with the LCAS reception control unit 505. The LCAS transmission control unit 514 illustratively generates the information for the CTRL generating unit 506, the generated path specifying unit 507, and the MST generating unit 515, based on each information obtained in the MST terminating unit 501, the path state receiving unit 502 and the CTRL terminating unit 503, and the setting information detected in the detecting units 509 and 510.

For example, the LCAS transmission control unit 514 gives the CTRL generating unit 506 instructions to generate CTRL=NORM or EOS regarding the member path of which MST obtained in the MST terminating unit 501 is OK and to generate CTRL=IDLE or DNU regarding the member path of which MST is FAIL.

Also, when the information obtained in the path state receiving unit 502 is the information indicating occurrence of the path failure, the LCAS transmission control unit 514 gives the generated path specifying unit 41 instructions to eliminate the member path in which the path failure occurs. Further, this gives the MST generating unit 515 instructions to generate MST=OK when CTRL obtained in the CTRL terminating unit 503 is ADD or NORM or EOS, and to generate MST=FAIL when the CTRL is IDLE or DNU.

Hereinafter, operation of the node 10 (20) having the above-described configuration is described using a flowchart illustrated in FIGS. 10 to 14.

Figure 10:
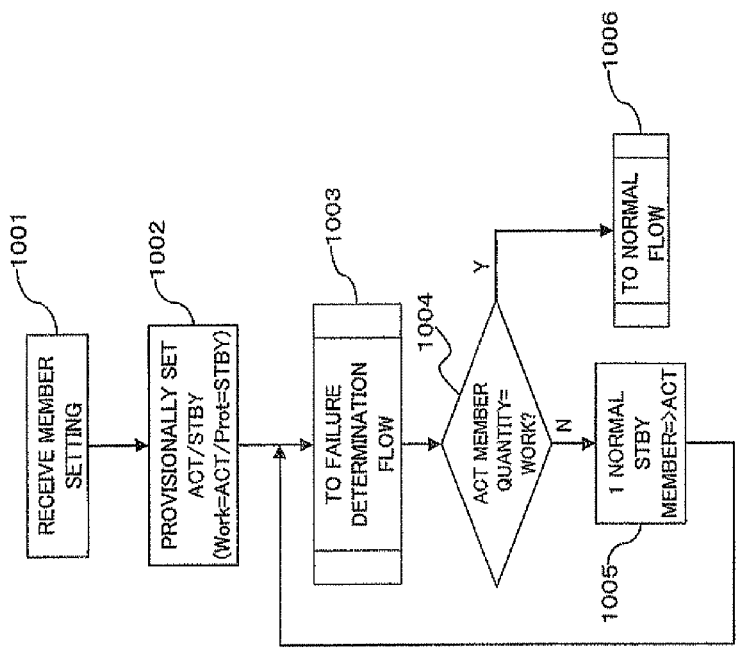
FIG. 10 is a flowchart for illustrating an operation (initial setting flow) of the node illustrated in FIGS. 8 and 9.

(2.1) Initial Setting Flow (FIG. 10)

As illustrated in FIG. 10, the node 10 (20) receives the setting information regarding the VCG member quantity (work/protection member path quantity), and the operational path (which VCG member path is set as the work member path) from the high-level device such as the NMS (process 1001). The setting information is detected by each of the detecting units 509 to 512, and is given to the ACT/STBY control unit 513.

When the ACT/STBY control unit 513 receives the setting information, this provisionally sets the ACT/STBY state of the work member path and the protection member path in a range not larger than the path quantity specified by the high-level device. For example, the work member path is set to the ACT state (Work=ACT) and the protection member path is set to the STBY state (Prot=STBY) (process 1002).

Figure 11:
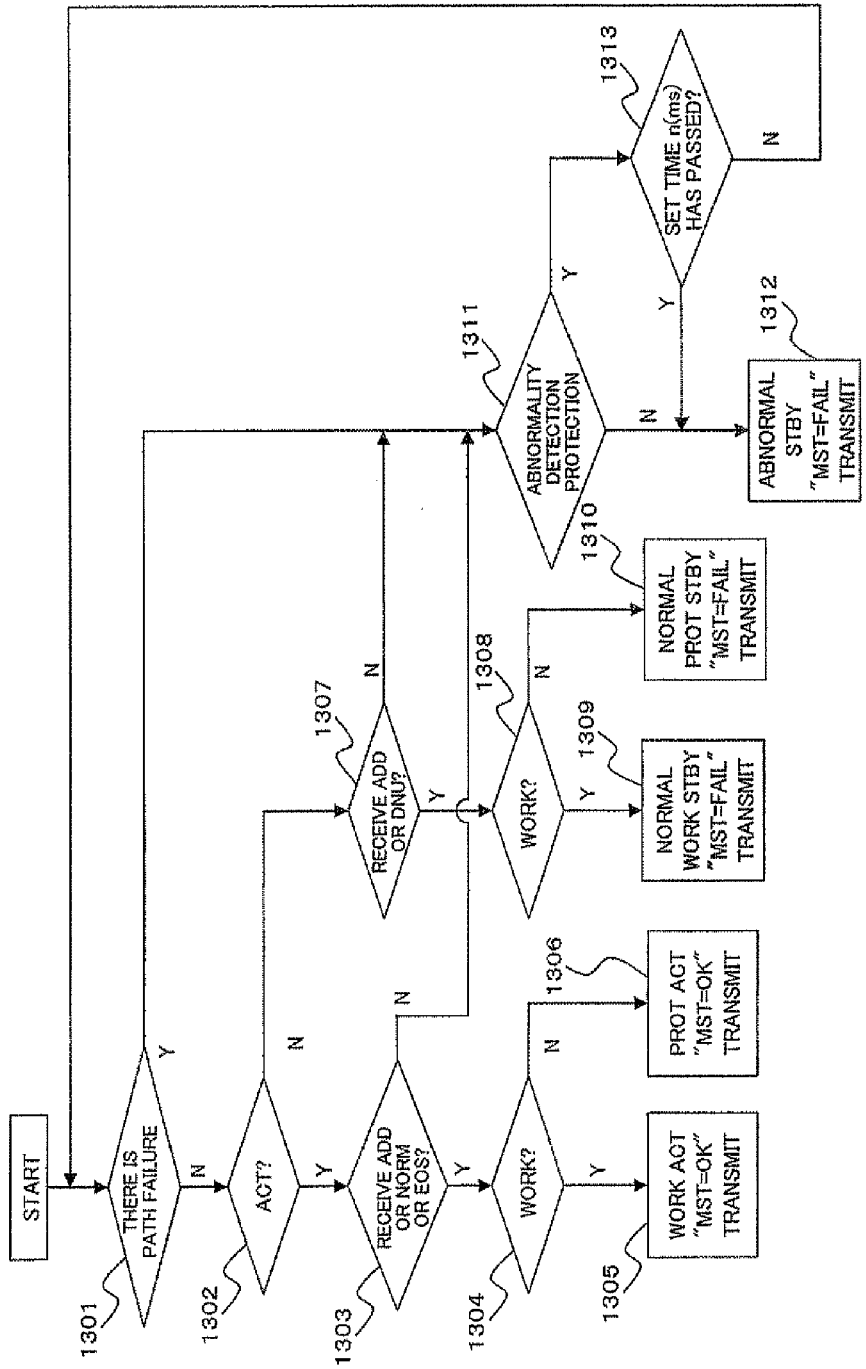
FIG. 11 is a flowchart for illustrating the operation (failure determination flow) of the node illustrated in FIGS. 8 and 9.

Next, the ACT/STBY control unit 513 performs a determination and update process of the ACT/STBY state, according to a failure determination flow illustrated in FIG. 11 (process 1003). Meanwhile, the flow illustrated in FIG. 11 is performed for each path of the VCG member, That is to say, the ACT/STBY control unit 513 monitors whether the failure occurs in each path of the VCG member or not based on the information obtained in the path state receiving unit 502 (process 1301), and when the path failure does not occur in a target VCG member path (N route from the process 1301), this confirms whether the member path is in the ACT state or not (process 1302).

As a result, when the target VCG member path is in the ACT state (Y route from the process 1302), the ACT/STBY control unit 513 confirms whether the member path receives CTRL=ADD or NORM or EOS or not, based on the information obtained in the CTRL terminating unit 503 (process 1303).

When this receives CTRL=ADD or NORM or EOS (Y route from the process 1303), it is confirmed that the target member path in the ACT state is normal, and the ACT/STBY control unit 513 confirms whether the target member path is the work member path or not (process 1304).

As a result, in a case of the work member path (Y route from the process 1304), the ACT/STBY control unit 513 sets the work member path to the ACT state, and gives the MST rewriting unit 508 instructions to generate and transmit MST=OK (process 1305).

On the other hand, when the target member path is not the work member path, that is to say, when this is the protection member path (N route from the process 1304), the ACT/STBY control unit 513 sets the protection member path to the ACT state, and gives the MST rewriting unit 508 instructions to generate and transmit MST=OK (process 1306).

In the process 1302, when the target member path is not in the ACT state, that is to say, when this is in the STBY state (N route from the process 1302), the ACT/STBY control unit 513 confirms whether the target member path receives CTRL=ADD or DNU or not, based on the information obtained in the CTRL terminating unit 503 (process 1307).

As a result, when this receives CTRL=ADD or DNU (Y route from the process 1307), normality of the target member path in the STBY state is confirmed, and the ACT/STBY control unit 513 confirms whether the target member path is the work member path or not (process 1308).

When the target member path is the work member path (Y route from the process 1308), the ACT/STBY control unit 513 sets the work member path to the normal STBY state capable of being set to the ACT state, and gives the MST rewriting unit 508 instructions to generate and transmit MST=FAIL (process 1309).

On the other hand, when the target member path is not the work member path, that is to say, when this is the protection member path (N route from the process 1308), the ACT/STBY control unit 513 sets the protection member path to the normal STBY state capable of being set to the ACT state, and gives the MST rewriting unit 508 instructions to generate and transmit MST=FAIL (process 1310).

Also, when the path failure is detected in the target member path in the process 1301, and when the normality of the target member path is not confirmed in the process 1303 or the process 1307 (N routes from the processes 1301, 1303, and 1307), the ACT/STBY control unit 513 confirms presence or absence of an abnormality detection protective function (process 1311).

Meanwhile, a case in which the normality of the target member path is not confirmed at the process 1303 or 1307 includes a case in which a reception error occurs due to deterioration in quality of the path signal, and a case in which the LCAS protocol communication is abnormal, as described above.

If there is the abnormality detection protective function (Y route from the process 1311), the ACT/STBY control unit 513 repeats the processes after the process 1301 until a predetermined time period (set time: n millisecond, for example) has passed (N route from the process 1313).

On the other hand, when the normality of the target member path is not confirmed even after the set time has passed (Y route from the process 1313), the ACT/STBY control unit 513 sets the target member path to the abnormal STBY state, which may not be set to the ACT state, and gives the MST rewriting unit 508 instructions to generate and transmit MST=FAIL (process 1312).

Also, if there is no abnormality detection protective function (N route from the process 1311), the ACT/STBY control unit 513 sets the target member path to the abnormal STBY state, which may not be set to the ACT state, without waiting for the set time to pass, and gives the MST rewriting unit 508 instructions to generate and transmit MST=FAIL (process 1312).

That is to say, transition from normality determination to abnormality determination of the ACT member path or the STBY member path may be immediately made without waiting for a certain time period to continue when the normality determination condition is not satisfied, or may be performed when a state in which the normal determination condition is not satisfied continues for a predetermined time period. The predetermined time period may be set by the high-level device such as the NMS.

By performing the above-described failure determination flow (processes 1301 to 1313), it becomes possible to update the ACT/STBY state of the work member path and the protection member path to the newest state. It is also possible that the failure determination flow is not performed in the initial setting flow.

Meanwhile, the ACT/STBY control unit 513 may identify the member path determined to be normal and the member path determined to be abnormal of the member paths in the STBY state, and may notify the high-level device such as the NMS of the normal/abnormal state for each member path. Thereby, the normality of the path may be confirmed by the high-level device (user) even though this is the member path in the stand-by state.

Figure 12:
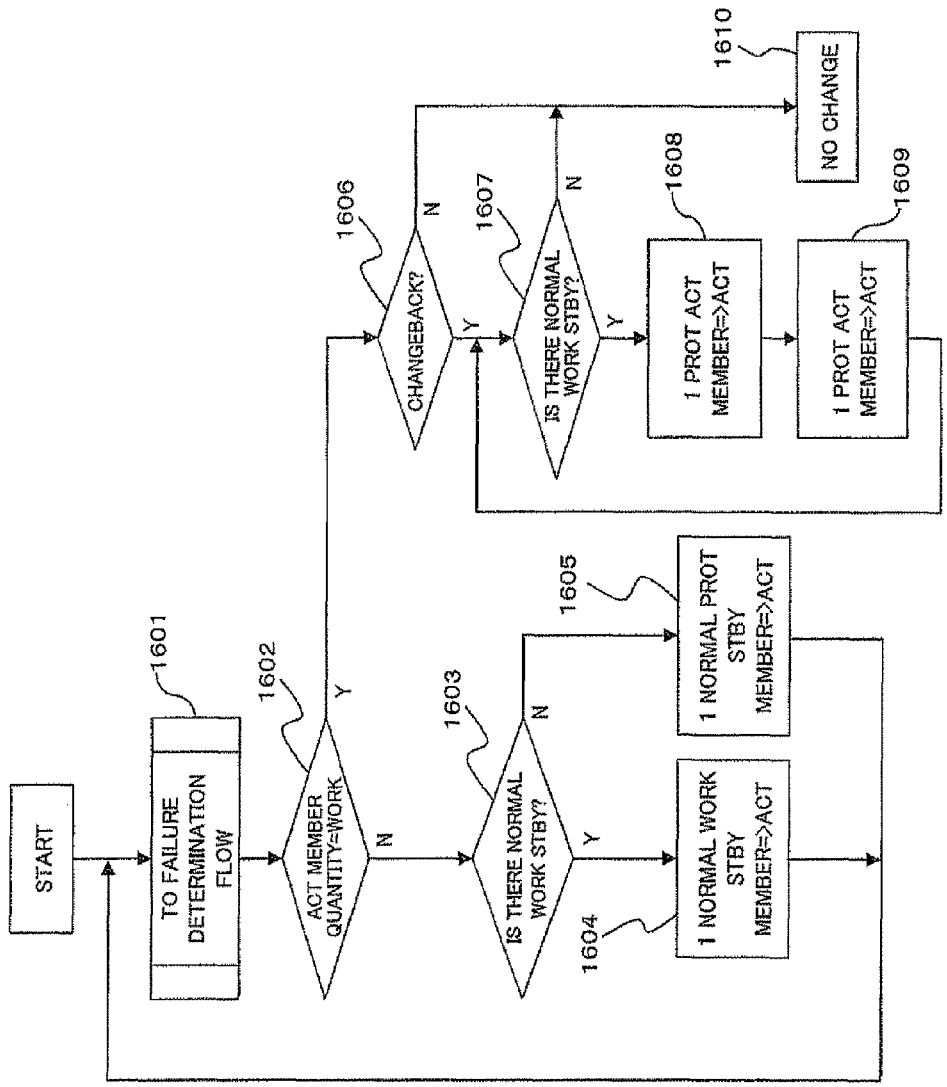
FIG. 12 is a flowchart for illustrating the operation (normal flow) of the node illustrated in FIGS. 8 and 9.

Next, as illustrated in FIG. 10, the ACT/STBY control unit 513 confirms whether the member path quantity in the ACT state conforms to the work member path quantity specified by the high-level device or not (process 1004), and if they conform to each other, this performs the normal flow illustrated in FIG. 12 (Y route from the process 1004 to the process 1006). If they do not conform to each other, the ACT/STBY control unit 513 adds the ACT member path quantity by setting one member path in the normal STBY state to the ACT state (N route from the process 1004 to the process 1005).

The additive process is repeatedly performed until the ACT member path quantity conforms to the specified work member path quantity. That is to say, the ACT/STBY control unit 513 enables to hold (maintain) the set work member path quantity by transiting the path in the normal STBY state to the ACT state one by one such that the ACT member path quantity conforms to the work member path quantity set by the high-level device.

Meanwhile, with regard to the STBY member path also, this may be controlled such that the STBY member path quantity conforms to the specified protection member path quantity. This may be different member path quantity.

(2.2) Normal Flow (FIG. 12)

Next, the process in the process 1006 of the initial setting flow is described.

As illustrated in FIG. 12, the ACT/STBY control unit 513 performs the failure determination flow (processes 1301 to 1313) illustrated in FIG. 11 (process 1601), and confirms whether the member path quantity in the ACT state conforms to the specified work member quantity or not (process 1602).

As a result, if they do not conform to each other (N route from the process 1602), the ACT/STBY control unit 513 confirms presence or absence of the work member path in the normal STBY state (process 1603). When there is one or a plurality of work member path in the normal STBY state (Y route from the process 1603), the ACT/STBY control unit 513 sets one work member path in the normal STBY state to the ACT state (process 1604) to perform the processes after the process 1601.

On the other hand, when there is no work member path in the normal STBY state (N route from the process 1603), the ACT/STBY control unit 513 sets one protection member path in the normal STBY state to the ACT state (process 1605), and performs the processes after the process 1601.

That is to say, when the member path quantity in the ACT state does not conform to the specified work member quantity, the ACT/STBY control unit 513 sets the work member path or the protection member path in the normal STBY state to the ACT state one by one to add the ACT member path until they conform to each other (until determined to be Y in the process 1602).

Thereby, it becomes possible to hold (maintain) the work member path quantity set by the high-level device, as in the already-described initial setting flow. Also, the target to be controlled in the active state in place of the member path in which the abnormality occurs is the member path in the normal STBY state obtained by eliminating the member path in the abnormal STBY state, so that reliability of path switching control is improved.

Meanwhile, although the above-described example is the example for preferentially adding any of the work member paths as the ACT member path, any of the protection member paths may be preferentially added. Also, the path to be added as the ACT member path may be decided according to another rule. For example, it is possible to alternatively set any of the work member paths and any of the protection member paths to the target to be added.

Also, in the process 1602, when the ACT member path quantity and the specified work member path quantity conform to each other (N route from the process 1602), the ACT/STBY control unit 513 confirms whether it is necessary to return the original work member path, which has become the abnormal STBY state due to the path failure occurrence, to the ACT state or not after the path failure is recovered (process 1606).

If it is not necessary (N route from the process 1606), the ACT/STBY control unit 513 does not change the ACT/STBY state of the current VCG member path, and maintains the current state regardless of whether this is the work member path or the protection member path (process 1610). That is to say, the member path, which becomes the ACT state instead due to the path failure occurrence, directly maintains the ACT state.

On the other hand, if it is necessary to return the original work member path to the ACT state (Y route from the process 1606), and when there is no work member path in the normal STBY state in the initial setting (before the path failure occurs), the ACT/STBY control unit 513 confirms whether the member path in the normal STBY state is present or not in the work member path (Y route from the process 1606 to the process 1607).

As a result, if there is the member path in the normal STBY state in the work member path (Y route from the process 1607), the ACT/STBY control unit 513 sets the work member path to the ACT state and sets the member path, which becomes the ACT state in place of the work member path, to the STBY state (processes 1608 and 1609).

The ACT/STBY control unit 513 repeats such state change process until the work member path in the normal STBY state is run out (until determined to be N in the process 1607) one by one.

That is to say, when the original member path in which the abnormality occurs is recovered, the ACT/STBY control unit 513 may select to control the abnormal path to the active state or to maintain the active state of the path controlled to the active state in place of the abnormal path. Necessity of such a change back process (selection) may be set by the high-level device, for example.

Figure 13:
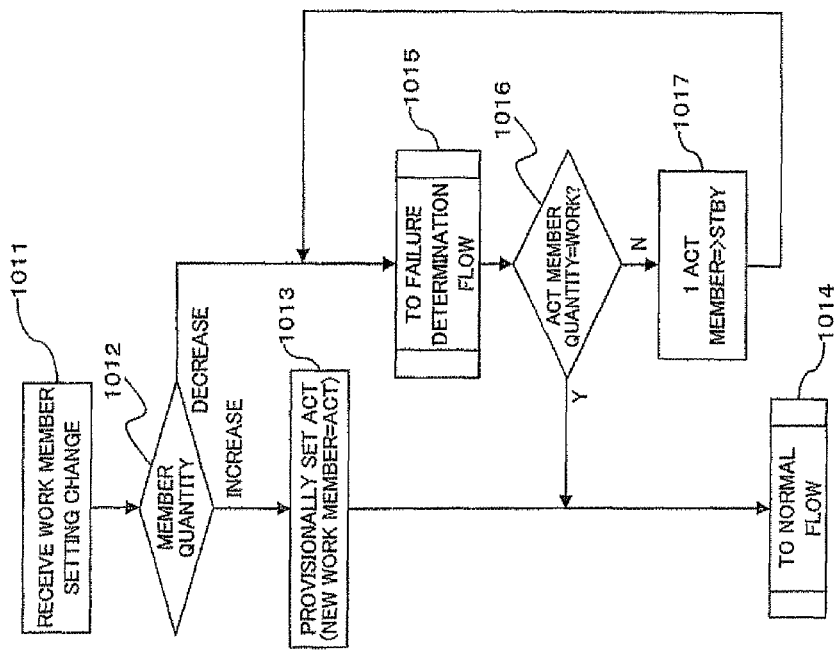
FIG. 13 is a flowchart for illustrating the operation (work member path setting change flow) of the node illustrated in FIGS. 8 and 9.

(2.3) VCG Member Path Setting Change Flow (FIGS. 13 and 14)

Next, an example of changing the setting of the VCG member path according to the instructions from the high-level device is described using FIGS. 13 and 14. Meanwhile, FIGS. 13 and 14 illustrate the setting change flow of the work member path and the setting change flow of the protection member path, respectively.

(2.3.1) Work Member Path Setting Change Flow (FIG. 13)

As illustrated in FIG. 13, the node 10 (20) receives the setting change information regarding the work member path quantity from the high-level device (process 1011). The setting information is detected by the work member quantity detecting unit 509 and is given to the ACT/STBY control unit 513.

When the ACT/STBY control unit 513 receives the setting change information, this confirms whether the specified wok member path quantity increases or decreases from the previous setting (process 1012). If this increases, the ACT/STBY control unit 513 provisionally sets increased new work member path to the ACT state ("increase" route from the process 1012 to the process 1013) to perform the normal flow (processes 1601 to 1610) described with reference to FIG. 12 (process 1014).

That is to say, when it is set that the work member path quantity increases, the ACT/STBY control unit 513 provisionally sets the new work member path specified by the high-level device as the ACT member path, and controls the ACT/STBY state of each member path according to presence or absence of the failure thereafter. At that time, it is possible to control the ACT/STBY state such that the ACT member path quantity becomes equal to specified work member path quantity.

On the other hand, when the specified work member path quantity decreases from the previous setting, the ACT/STBY control unit 513 performs the failure determination flow (processes 1301 to 1314) illustrated in FIG. 11 ("decrease" route from process 1012 to process 1015). That is to say, this updates the ACT/STBY state of each member path to the newest state. After the update, the ACT/STBY control unit 513 confirms whether the ACT member path quantity conforms to the new work member path quantity specified by the setting change information or not (process 1016).

As a result, when they conform to each other (Y route from the process 1016), the ACT/STBY control unit 513 performs the normal flow (processes 1601 to 1610) described with reference to FIG. 12 (process 1014). When the ACT member path quantity does not conform to the new work member path quantity (N route from the process 1016), the ACT/STBY control unit 513 sets the member path in the ACT state to STBY state one by one until they conform to each other (until determined to be Y in the process 1016) (process 1017).

In this manner, when the work member path quantity decreases, the ACT member path quantity is transferred to the STBY state one by one, and at the time that the ACT member path quantity=specified work member path quantity, the decrease setting of the work member path quantity may be completed.

(2.3.2) Protection Member Path Setting Change Flow (FIG. 14)

As illustrated in FIG. 14, the node 10 (20) receives the setting change information regarding the protection member path quantity from the high-level device (process 1021). The setting information is detected by the protection member quantity detecting unit 511 and is given to the ACT/STBY control unit 513.

When the ACT/STBY control unit 513 receives the setting change information, this confirms whether the specified protection member path quantity increases or decreases from the previous setting (process 1022). If this increases, the ACT/STBY control unit 513 provisionally sets the increased new protection member path to the STBY state ("increase" route from the process 1022 to the process 1023) to perform the normal flow (processes 1601 to 1610) described with reference to FIG. 12 (process 1024).

That is to say, when it is set that the protection member path quantity increases, the ACT/STBY control unit 513 provisionally sets the new protection member path specified by the high-level device to the STBY member path and controls the ACT/STBY state of each member path according to presence or absence of the failure thereafter. At that time, it is possible to control such that the STBY member path quantity=specified protection member path quantity.

On the other hand, when the specified new protection member path quantity decreases from the previous setting, the ACT/STBY control unit 513 performs the failure determination flow (processes 1301 to 1314) illustrated in FIG. 11 ("decrease" route from the process 1022 to the process 1025). That is to say, this updates the ACT/STBY state of each member path to the newest state. After this update, the ACT/STBY control unit 513 confirms whether the STBY member path quantity conforms to the new protection member path quantity specified by the setting change information or not (process 1026).

As a result, if they conform to each other (Y route from the process 1026), the ACT/STBY control unit 513 performs the normal flow (processes 1601 to 1610) described with reference to FIG. 12 (process 1024). When the STBY member path quantity does not conform to the new protection member path quantity (N route from the process 1026), the ACT/STBY control unit 513 deletes the member paths in the STBY state one by one until they conform to each other (until determined to be Y in the process 1026) (process 1027).

In this manner, when the protection member quantity decreases, the STBY member paths are deleted from the VCG member one by one, and at the time that STBY member path quantity=specified protection member path quantity, the decrease setting of the protection member path quantity may be completed.

At that time, the STBY member path to be deleted may be set by the high-level device, or the member path in the abnormal STBY state may be automatically deleted.

Meanwhile, in the setting change flow illustrated in FIGS. 13 and 14, the failure determination flow is not necessarily performed.

As described above in detail, according to this embodiment, it is possible to set the paths in the nonoperational state (normal STBY state), as many as those in which the path failure occurs, to the operational (ACT) state and supply, when the path failure occurs in one or a plurality of the VCG member paths in the operational state. Therefore, significant variation (increase and decrease) of the operational band before and after the path failure occurrence may be prevented.

In addition, the member path in the normal STBY state used in the supply may be any of the work member path and the protection member path, so that the path level redundancy may be realized with free combination, which is not based on the work/protection setting of the VCG member path. Therefore, the redundant configuration capable of optimizing efficiency of using the band according to the network configuration may be realized.

All examples and conditional language recited herein are intended for pedagogical purposes to aid the reader in understanding the invention(s) and the concepts contributed by the inventor(s) to furthering the art, and are to be construed as being without limitation to such specifically recited examples and conditions, nor does the organization of such examples in the specification relate to a illustrating of the superiority and inferiority of the invention. Although the embodiment(s) has been described in detail, it should be understood that the various changes, substitutions, and alterations could be made hereto without departing from the spirit and scope of the invention(s).

What is claimed is:

1. A transmission system that virtually concatenates each path signal transmitted through a plurality of paths being a logical communication path to form a virtual concatenation group, the system comprising:

managing section to manage an active state and a stand-by state of member paths of the virtual concatenation group, each of the member paths is previously set to be a work member path or a protection member path; and control section to control any of the member paths in the stand-by state to the active state in place of any of the member paths in the active state that has abnormality, wherein if one or more of work member paths are in the stand-by state, the control section controls one of the work member paths in the stand-by state to the active state, and if none of the work member paths is in the stand-by state, the control section controls one of protection member paths in the stand-by state to the active state.

2. A path control method in a transmission system that virtually concatenates each path signal transmitted through a plurality of paths being a logical communication path to form a virtual concatenation group, the method comprising:

managing an active state and a stand-by state of member paths of the virtual concatenation group, each of the member paths is previously set to be a work member path or a protection member path; and controlling any of the member paths in the stand-by state to the active state in place of any of the member paths in the active state that has abnormality, wherein if one or more of work member paths are in the stand-by state, the controlling controls one of the work member paths in the stand-by state to the active state, and if none of the work member paths is in the stand-by state, the controlling controls one of protection member paths in the stand-by state to the active state.

3. A transmission device on a receiving side for receiving a path signal from the transmission device on a transmitting side that virtually concatenates each path signal transmitted through a plurality of paths being a logical communication path to form a virtual concatenation group, the device comprising:

managing section to manage an active state and a stand-by state of member paths of the virtual concatenation group, each of the member paths is previously set to be a work member path or a protection member path; and control section to control any of the member paths in the stand-by state to the active state in place of any of the member paths in the active state that has abnormality, wherein if one or more of work member paths are in the stand-by state, the control section controls one of the work member paths in the stand-by state to the active state, and if none of the work member paths is in the stand-by state, the control section controls one of protection member paths in the stand-by state to the active state.

4. The transmission device according to claim 3, wherein the active state is a state to transmit OK to the transmission device on the transmitting side as state notifying information of the member paths in a link capacity adjustment scheme (LCAS) protocol, and the stand-by state is a state to transmit FAIL to the transmission device on the transmitting side as the state notifying information regardless of normality or abnormality of the member paths.

5. The transmission device according to claim 4, wherein the control section performs the control such that a member path quantity in the active state is constant before and after occurrence of the abnormality.

6. The transmission device according to claim 5, wherein the constant number can be set by a high-level device.

7. The transmission device according to claim 4, wherein the managing section confirms the normality of the member path in the active state, based on the absence of information indicating occurrence of a path failure and the presence of one of ADD, NORM, EOS commands in the link capacity adjustment scheme (LCAS) protocol from the transmission device on the transmitting side, with regard to the member path in the active state.

8. The transmission device according to claim 4, wherein the managing section confirms the normality of the member path in the stand-by state, based on the absence of information indicating the occurrence of the path failure and the presence of one of ADD, DNU commands in the link capacity adjustment scheme (LCAS) protocol from the transmission device on the transmitting side, with regard to the member path in the stand-by state.

9. The transmission device according to claim 3, wherein the control section performs the control such that a member path quantity in the active state is constant before and after occurrence of the abnormality.

10. The transmission device according to claim 9, wherein the constant number can be set by a high-level device.

11. The transmission device according to claim 10, wherein the managing section confirms the normality of the member path in the active state, based on the absence of information indicating occurrence of a path failure and the presence of one of ADD, NORM, EOS commands in the link capacity adjustment scheme (LCAS) protocol from the transmission device on the transmitting side, with regard to the member path in the active state.

12. The transmission device according to claim 9, wherein the managing section confirms the normality of the member path in the active state, based on the absence of information indicating occurrence of a path failure and the presence of one of ADD, NORM. EOS commands in the link capacity adjustment scheme (LCAS) protocol from the transmission device on the transmitting side, with regard to the member path in the active state.

13. The transmission device according to claim 3, wherein the managing section confirms the normality of the member path in the active state, based on the absence of information indicating occurrence of a path failure and the presence of one of ADD, NORM, EOS commands in the link capacity adjustment scheme (LCAS) protocol from the transmission device on the transmitting side, with regard to the member path in the active state.

14. The transmission device according to claim 13, wherein the control section determines that the member path in the active state is abnormal immediately after the normality cannot be confirmed, or after a predetermined time period during which the normality cannot be confirmed.

15. The transmission device according to claim 3, wherein the managing section confirms the normality of the member path in the stand-by state, based on the absence of information indicating the occurrence of the path failure and the presence of one of ADD, DNU commands in the link capacity adjustment scheme (LCAS) protocol from the transmission device on the transmitting side, with regard to the member path in the stand-by state.

16. The transmission device according to claim 15, wherein the control section determines that the member path in the stand-by state is abnormal immediately after the normality cannot be confirmed, or after a predetermined time period during which the normality cannot be confirmed.

17. The transmission device according to claim 16, wherein the control section excludes the member path in the stand-by state determined to be abnormal from a target of the control to the active state.

18. The transmission device according to claim 16, wherein the managing section notifies an exterior device of a normality/abnormality determination result for each member path in the stand-by state.

19. The transmission device according to claim 3, wherein if the member path in which the abnormality has occurred recovers, the control section selects to return the abnormal member path to the active state or to maintain the active state of the member path controlled to the active state in place of the abnormal member path.

20. The transmission device according to claim 19, wherein the selection can be set by a high-level device.

* * * * *